United States Patent
Wolfe

[19]

[11] Patent Number: 6,040,542
[45] Date of Patent: Mar. 21, 2000

[54] FLEXIBLE SWITCH APPARATUS AND METHOD FOR MAKING SAME

[75] Inventor: George B. Wolfe, Plymouth, Mich.

[73] Assignee: TRW Inc., Lyndhurst, Ohio

[21] Appl. No.: 09/176,186

[22] Filed: Oct. 21, 1998

[51] Int. Cl.[7] ................................................ H10H 1/10
[52] U.S. Cl. ..................... 200/512; 200/513; 200/61.54
[58] Field of Search ................... 200/61.54, 5, 2, 200/314, 513, 292, 5 A, 275, 516, 310–317; 307/10.1–10.8; 280/731; 338/2, 6, 50, 99, 209, 69, 210, 211, 4, 47

[56] References Cited

U.S. PATENT DOCUMENTS

| | | | |
|---|---|---|---|
| 4,934,735 | 6/1990 | Embach | 280/731 |
| 5,338,059 | 8/1994 | Inoue et al. | 280/728 B |
| 5,351,542 | 10/1994 | Ichimura et al. | 73/517 R |
| 5,371,333 | 12/1994 | Kanai et al. | 200/61.54 |
| 5,399,819 | 3/1995 | Lang et al. | 200/61.54 |
| 5,465,998 | 11/1995 | Davis | 280/731 |
| 5,520,412 | 5/1996 | Davis | 280/728.3 |
| 5,542,694 | 8/1996 | Davis | 280/728.3 |
| 5,569,893 | 10/1996 | Seymour | 200/61.54 |
| 5,625,333 | 4/1997 | Clark et al. | 338/2 |

*Primary Examiner*—Michael L. Gellner
*Attorney, Agent, or Firm*—Tarolli, Sundheim, Covell, Tummino & Szabo L.L.P.

[57] ABSTRACT

A switch apparatus (12) includes a substrate (20) of a resilient material having a first surface (40), with a channel (44 or 46) formed through the substrate to define a flex portion (48) of the substrate. At least part of the flex portion (48) of the substrate (20) is movable relative to the substrate between a first position and a second position. A layer of an elastic material (62) is disposed over at least a substantial portion of the first surface (40) of the substrate (20). The layer of elastic material urges the flex portion (48) to the first position of the flex portion. A switch element (53) is operatively associated with the flex portion (48) of the substrate (20) and has an electrical condition which varies as a function of the position of the flex portion.

16 Claims, 2 Drawing Sheets

FLEXIBLE SWITCH APPARATUS AND METHOD FOR MAKING SAME

TECHNICAL FIELD

The present invention relates to a flexible switch apparatus and a method for making the flexible switch apparatus.

BACKGROUND OF THE INVENTION

One common type of switch device includes a flexible dome-shaped portion which is bendable to change the state of the switch.

Another type of switch device is formed of numerous separate parts which are assembled together. This switch includes at least one part which is movable to open and close an electrical circuit. In this type of switch device, there is a possibility of the switch malfunctioning, such as due to misalignment of parts.

SUMMARY OF THE INVENTION

The present invention is directed to a flexible switch apparatus which includes a substrate of a resilient material having a substantially planar first surface. The substrate includes a flex portion formed in the substrate, which is movable relative to the substrate between a first position and a second position. A layer of an elastic material is disposed over at least a substantial portion of the first surface of the substrate. The layer of elastic material urges the flex portion to the first position. A switch element is operatively associated with the flex portion of the substrate. The switch element has an electrical condition which varies as a function of the position of the flex portion relative to the substrate.

Another aspect of the present invention is directed to a method for making a switch apparatus. The method includes providing a substrate of a resilient material having a substantially planar first surface. At least one switch element is attached adjacent the first surface of the substrate. A layer of elastic material is applied over at least a substantial portion of the first surface of the substrate. The method further includes forming at least one channel through the substrate material adjacent the switch element to define a flex portion of the substrate, which is movable between a first position and a second position. The switch element has an electrical condition which varies as a function of the position of the flex portion.

BRIEF DESCRIPTION OF THE DRAWINGS

The foregoing and other features of the invention will become more apparent to one skilled in the art upon consideration of the following description of the invention and the accompanying drawings in which.

DESCRIPTION OF A PREFERRED EMBODIMENT

Figure 1:
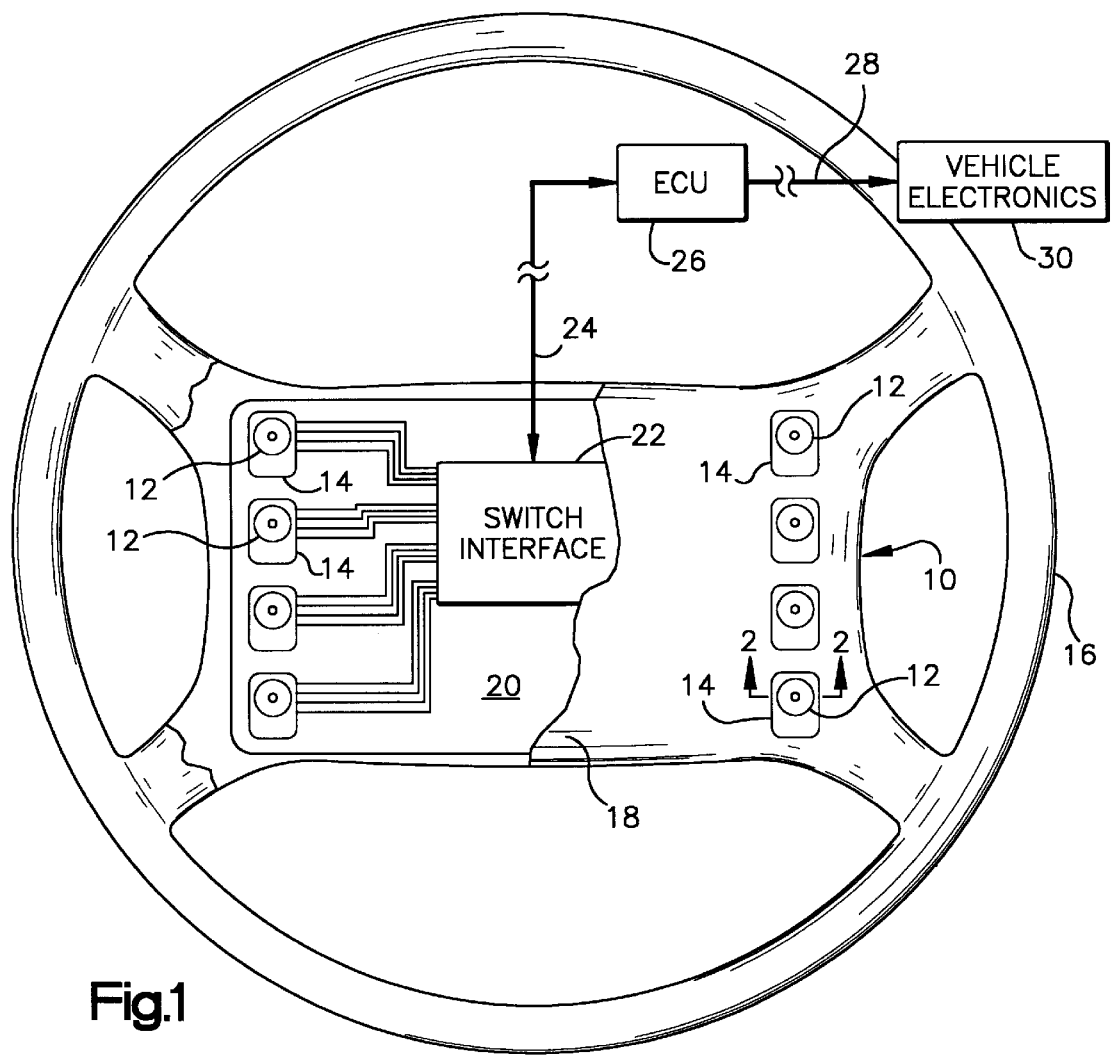
FIG. 1 is a schematic representation of a preferred embodiment of a switch apparatus in combination with a vehicle steering wheel, part of which as illustrated is partially removed.

FIG. 1 illustrates a preferred embodiment of a switching control device 10 having a plurality of switch apparatuses 12 in combination with a vehicle steering wheel 16. Alternatively, a single switch apparatus 12 could be utilized. A steering wheel cover 18 is disposed over a resilient substrate material, such as a circuit board 20 of the switching control device 10. The steering wheel cover 18 preferably is integrally connected with at least a portion of each switch apparatus 12 to form actuatable switch buttons 14.

Each switch apparatus 12 is electrically connected with a switch interface 22, which also is connected with the circuit board 20. The switch interface 22 distributes switching signals provided by each switch apparatus 12. The switch interface 22 also may distribute control signals to each respective switch apparatus 12. The switch interface 22 preferably provides a signal 24 to an external electronic control unit 26 which monitors the status of each switch apparatus 12.

In response to the signal 24 from the switch interface 22, the ECU 26 provides control signals 28 to a variety of vehicle electronic equipment, indicated schematically at 30. Such vehicle electronics 30 may include, for example, a vehicle horn, HVAC controls, radio controls, cruise control, turn signal controls, wiper controls, cell phone controls, temperature controls, trip computer, etc.

While a preferred embodiment of the switching control device 10 of the present invention is illustrated as part of a vehicle steering wheel 16, it will be understood and appreciated that the switch apparatus 12 of the present invention is equally applicable for use with any type of electronic device which may be controlled by one or more switches. It also will be understood and appreciated that the ECU 26 and/or vehicle electronics 30 may be part of the circuit board 20.

Figure 2:
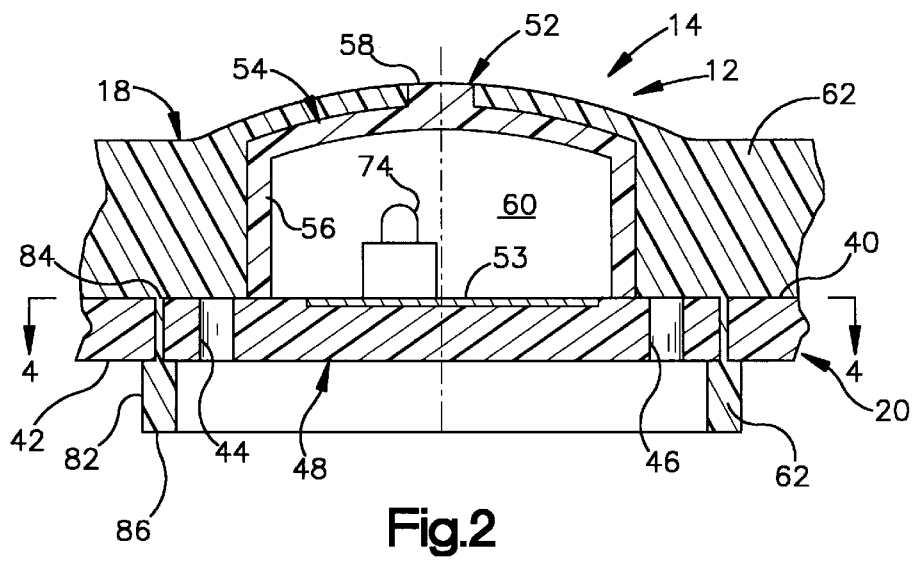
FIG. 2 is a sectional view of a portion of the apparatus of FIG. 1 taken along line 2—2 of FIG. 1.
Figure 3:
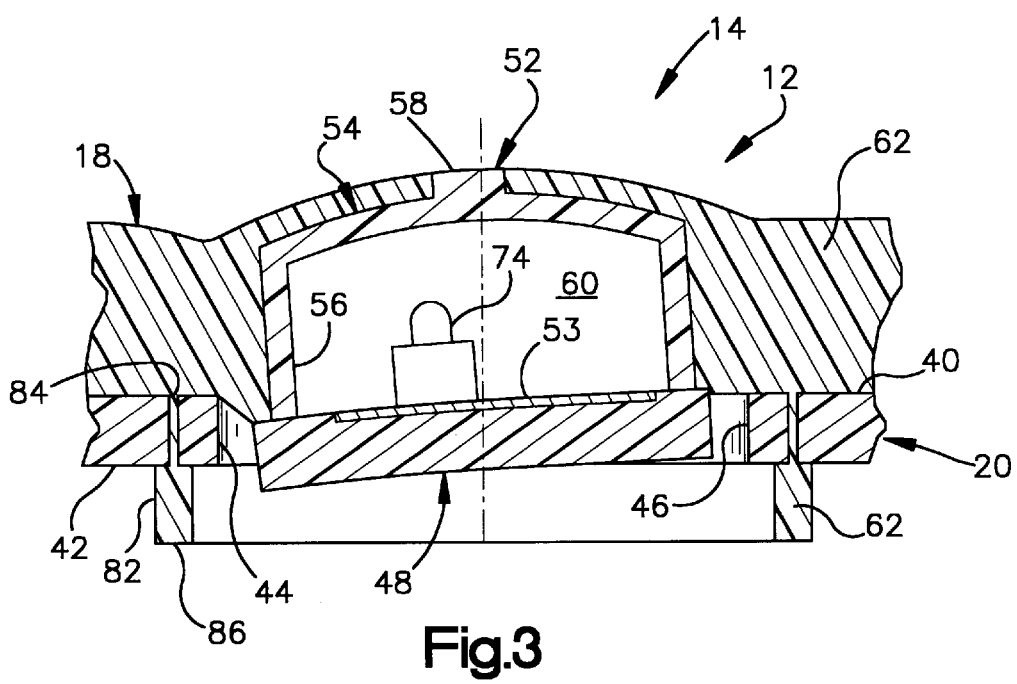
FIG. 3 is a sectional view similar to FIG. 2, illustrating an actuated condition of the apparatus.
Figure 4:
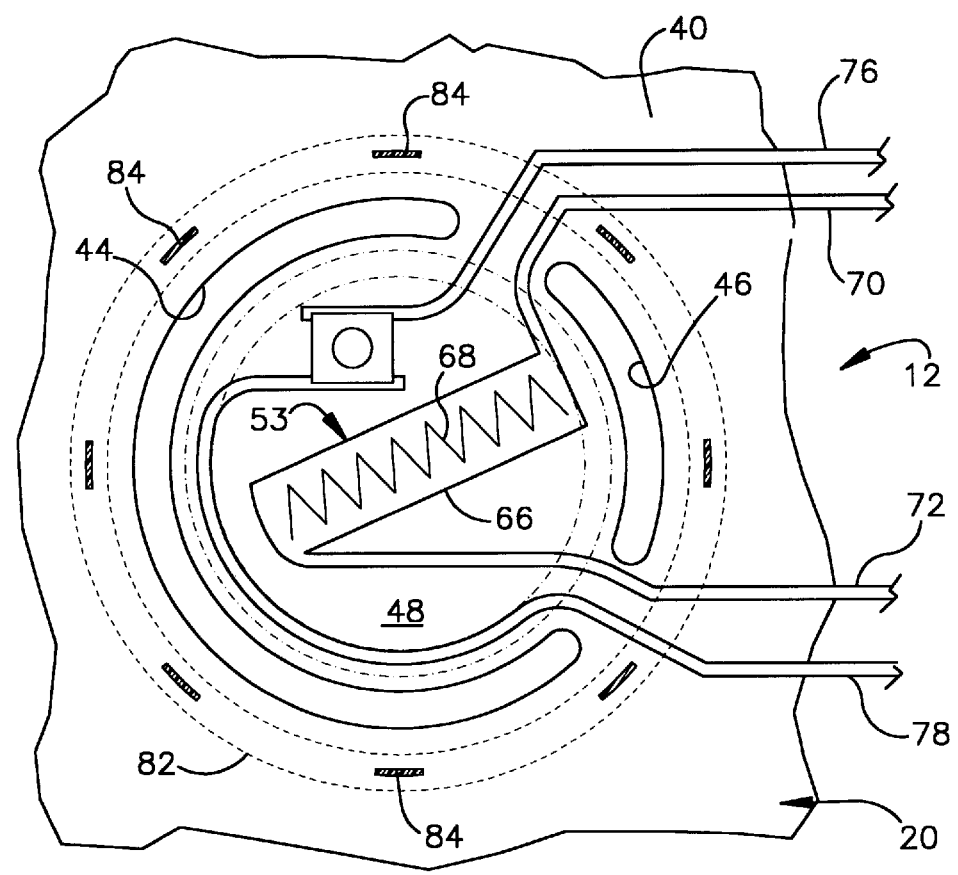
FIG. 4 is a top sectional view of a preferred embodiment of the apparatus taken along line 4—4 of FIG. 2.

FIGS. 2–4 illustrate a preferred embodiment of a flexible switch apparatus 12 in accordance with the present invention. The switch apparatus 12 includes a substantially resilient substrate material, suitably a conventional circuit board 20. The circuit board 20 has a substantially planar first surface 40 and a second surface 42 opposite the first surface 40. The circuit board 20 may be formed of any known resilient material, preferably a known insulating material, such as is used in the manufacture of conventional printed circuit boards.

The switch apparatus 12 further includes at least one and preferably a pair of arcuate channels 44 and 46 formed through the circuit board 20 to define a flex portion 48. The channels 44 and 46 may be formed by cutting through the circuit board 20, suitably by laser or by any other conventional cutting method. In this way, a substantial part of the flex portion 48 of the circuit board 20 is movable relative to the circuit board. In this preferred embodiment, the flex portion 48 is movable between a first position, such as shown in FIG. 2, in which the flex portion is substantially aligned with the circuit board 20, and a second position, such as shown in FIG. 3, in which the flex portion 48 is not substantially aligned with the circuit board.

A switch assembly 52 is operatively associated with the flex portion 48 of the circuit board 20. The switch assembly 52 includes a switch element 53, which has an electrical condition that varies as a function of the position of the flex portion 48 relative to the surrounding part of the circuit board 20. Accordingly, when the flex portion 48 is in the first position of FIG. 2, the switch element 53 has a first electrical condition. The switch element 53 also has a second electrical condition, which is different from the first condition and corresponds to the second position of the flex portion 48, as shown in FIG. 3. Movement of the flex portion 48 thus effects a change in the electrical condition of the switch element 53 of the switch assembly 52.

In the preferred embodiment illustrated in FIGS. 2 and 3, the switch assembly 52 includes a substantially rigid housing 54 having a generally cylindrical sidewall portion 56. The sidewall portion 56 is connected with and extends outwardly from the first surface 40 of the flex portion 48 and terminates in an end portion 58 spaced from the circuit board 20. The interior of the housing 54 defines a hollow chamber 60 adjacent the first surface 40 of the flex portion 48.

A layer of an elastic material 62 is disposed over at least a substantial portion of the first surface 40 of the circuit board 20. Preferably, the elastic layer 62 is bonded to at least a portion of the first surface 40 of the circuit board 20 on opposed sides of and covering each of the channels 44 and 46. The elastic layer 62 also preferably is integrally connected with at least a substantial part of the sidewall 56 and end portion 58 of the housing 54 to define an actuatable switch button 14. Preferably, at least part of the end portion 58 of the housing 54 remains visibly exposed and free of the elastic layer 62.

The elastic layer 62 urges the flex portion 48 into substantial alignment with the adjacent part of the surrounding circuit board 42, such as shown in FIG. 2. Preferably, the elastic layer 62 is integrally molded, suitably by injection molding, in situ over the first surface 40 to provide an outer elastic layer having a predetermined thickness, which is approximate the height of the housing 54. In this configuration, an external force applied axially to the housing 54 urges the flex portion 48 out of alignment with the circuit board 20 and into its second position, such as shown in FIG. 3. As the external force is removed, the elastic layer 62 biases the flex portion 48 back into alignment with the circuit board 20 adjacent the flex portion, such as shown in FIG. 2.

As shown in FIGS. 2–4, various electronics may be positioned within the chamber 60 of the housing 54. In order to sense movement of the flex portion 48, for example, the switch element 53 may be a flex sensor. The flex sensor 53 is connected with the flex portion 48 of the circuit board 20 within the hollow chamber 60. The flex sensor 53 has an electrical condition which varies as it flexes or bends, such as upon movement of the flex portion 48 relative to the circuit board 20.

As shown in FIG. 4, the flex sensor 53 preferably includes a strip of a variable resistance material 66 operatively connected with the flex portion 48 of the circuit board 20. The variable resistance element 66, for example, may include a resistive ink deposit 68 disposed on the strip 66 and extending between the ends of the resistance element. The resistance of the resistance element 66 varies as a function of the position of the flex portion 48. Specifically, as the flex portion 48 is urged out of alignment with the circuit board 20, such as shown in FIG. 3, the variable resistance element 66, including the resistive ink deposit 68, is bent, thereby changing its resistance.

A suitable variable resistance element 66 is described in U.S. Pat. No. 5,157,372, which is incorporated herein by reference. Alternatively, the switch element 53 could be formed of a capacitive switch, a conventional contact switch or any other switch device operable to change states upon movement of the flex portion 48.

A pair of leads 70 and 72 are electrically connected to the ends of the resistive element 66. The leads 68 and 70 also are connected to a detector circuit, such as the switch interface 22 shown in FIG. 1. The switch interface 22 detects the electrical condition of the switch element 53, which in this example is the resistance of the resistive element 66. Alternatively, the leads 70 and 72 could be connected directly with an ECU which detects the state of the switch device for control of an associated electronic device.

The switch apparatus 12 also may include a light source, such as a light emitting diode (LED) 74, disposed within the chamber 60 of the housing 54. The LED 74 is electrically connected via conducting wires 76 and 78 of the printed circuit board 20 to a controllable source of electrical energy. For example, the switch interface 22 of FIG. 1 may operate to provide electrical energy to forward bias the diode 74. Preferably, at least the end portion 58 of the housing 54 is formed of a substantially transparent material to permit passage of light from the LED 74, when energized by the source of electrical energy.

Referring to the steering wheel example of FIG. 1, it may be desirable to light one or more of the switch apparatuses 12, such as when a vehicle lighting system has been activated by the user or during certain times of day. In this embodiment, the ECU 26 thus may provide an appropriate signal 24 to the switch interface 22. In response to the signal 24 from the ECU 36, the switch interface 22 provides an electrical signal over conducting wires 76 and 78 to forward bias and energize the LED 74. This conveniently enables a user to more readily locate the respective switch buttons 14. In addition, or in the alternative, the outer elastic layer 62 may include one or more color shots associated with each switch button 14. For example, different colors may provide for functional separation from the rest of the wheel cover 18.

Because the flex portion 48 is configured to move out of the plane of the circuit board 20, sufficient clearance should be provided to ensure that the flex portion 48 does not engage adjacent components structure within the steering wheel assembly 16 upon being actuated. Accordingly, it is preferable to include a protruding member 82 extending from the lower surface 42 of the circuit board 20 adjacent to the flex portion 48 of each switch apparatus 12. The protruding member 82 preferably is annular and surrounds the flex portion 48.

In order to form the protruding member 82, which preferably is part of the elastic layer 62, a plurality of slots 84 may be formed through the circuit board 20 prior to applying the outer elastic layer 62. The slots 84 provide for the flow of elastic material through the circuit board to connect the elastic layer 62, which surrounds the switch assembly 52, to the protruding member 82. A lower edge 86 of the annular protruding member may remain open. Alternatively, a suitable cover may be applied to the protruding member 82, which also may limit movement of the flex portion 48 relative to the circuit board 20.

In order to form the flexible switch apparatus 12 described above, a resilient substrate material is provided, such as the circuit board 20 shown in FIG. 1.

The circuit board 20 is preferably designed to provide a plurality of switching control functions, such as for control of vehicle accessories. Accordingly, one or more switch elements 53 are positioned at desired locations.

The electronic circuit components and switch assembly structures, including the flex sensor 64 and the respective housing 54 are attached to the circuit board 20 in a conventional manner. In order to facilitate the attachment of the housing 54 to the circuit board 20, the housing may include a plurality of pins (not shown) extending from its lower sidewall portion 56. The pins connect to corresponding mating holes formed in the circuit board 20. Alternatively, an adhesive material may be used to provide a temporary physical connection between the housing 54 and the first surface 40 of the circuit board 20. It will be understood and appreciated that, alternatively, the rigid housing 54 may be loaded into an appropriate mold for attachment to the circuit board 20 during a suitable molding process.

Once all the desired components are attached to the circuit board 20, the circuit board is loaded into an appropriately configured mold, such as for injection molding. Next, the mold is closed and the elastic material layer 62 is applied, preferably integrally molded in situ onto the first surface 40 of the circuit board 20. The protruding member 82 also may be molded onto the second surface 42 of the circuit board 20 adjacent each respective flex portion 48. The elastic layer 62 thus encapsulates each housing 54 and is bonded to adjacent portions of the first surface 40 of the circuit board 20 surrounding the each housing. This results in a one piece integral switching control device 10 having one or more switching control functions.

After the injection molding process, the circuit board 20 of the integral assembly 10 is cut, suitably by laser, to form the channels 44 and 46 through the circuit board. The channels 44 and 46 define the flex portion 48. Additional cuts also may be made in the circuit board 20, such as, for example, where the integral switching control device forms a steering wheel cover 18, as shown in FIG. 1. The additional cuts may be made in the circuit board 20 to provide an air bag tear seam. The switching interface 22 also may include a conventional connector assembly for electrical connection with an external ECU 26 or other vehicle electronics 30 as described above. Alternatively, the interface 22 may be directly wired to suitable control electronics.

In view of the foregoing, it is shown that the apparatus of the present invention provides a switching device capable of providing at least one switching function. The apparatus can be used to minimize the number of parts and allows for efficient and economical manufacture of the apparatus. The one piece integral assembly also facilitates installation as less assembly and fewer interconnections are required. It will be appreciated that the outer elastic layer 62 can be kept relatively thin to reduce overall thickness of the resulting switching control structure. Advantageously, this reduces the space requirements for the switching apparatus, thus providing additional room for other components.

From the above description of the invention, those skilled in the art will perceive improvements, changes and modifications. Such improvements, changes and modifications within the skill of the art are intended to be covered by the appended claims.

Having described the invention, the following is claimed:

1. A method of making a switch apparatus comprising the steps of:

providing a substrate of a resilient material having a substantially planar first surface;

locating at least one switch element adjacent the first surface of the substrate;

applying a layer of elastic material over at least a substantial portion of the first surface of the substrate, the layer of elastic material bonding with a substantial portion of the first surface of the substrate adjacent the switch element; and forming at least one channel through the substrate material adjacent the switch element to define a flex portion of the substrate which is movable between a first position and a second position, the switch element having an electrical condition which varies as a function of the position of the flex portion relative to the substrate.

2. The method of claim 1 wherein said step of applying further includes integrally molding the layer of elastic material to the substrate.

3. A switch apparatus comprising:

a substrate of a resilient material having a substantially planar first surface, a channel formed through said substrate to define a flex portion of said substrate, at least part of said flex portion of said substrate being movable relative to said substrate between a first position and a second position which is different from the first position;

a layer of an elastic material disposed over at least a substantial portion of said first surface of said substrate, said layer of elastic material urging said flex portion to the first position of said flex portion; and a switch element operatively associated with said flex portion of said substrate, said switch element having an electrical condition which varies as a function of the position of said flex portion relative to said substrate;

said switch element further including a substantially rigid housing having a sidewall portion which extends outwardly from the first surface of said flex portion and terminates in an end portion of said housing spaced from said substrate, said layer of elastic material integrally connected with a substantial part of said housing.

4. The apparatus of claim 3 wherein said housing of said switch element further includes a hollow chamber formed within said housing adjacent said flex portion of said substrate.

5. The apparatus of claim 4 further including an light source disposed within said chamber of said housing, said light source being electrically connected via an electrical connection of said substrate to a controllable source of electrical energy.

6. The apparatus of claim 5 wherein said light source is a light emitting diode.

7. The apparatus of claim 5 wherein said end portion of said housing is formed of a substantially transparent material to permit passage of light from said light source through said end portion, upon being activated by the source of electrical energy.

8. The apparatus of claim 4 wherein said switch element further includes a flex sensor disposed on said flex portion of said substrate within said hollow chamber, said flex sensor having an electrical condition which varies as a function of the position of said flex portion relative to said substrate.

9. The apparatus of claim 4 wherein said layer of elastic material has a thickness and said end portion of said housing is spaced from said substrate a distance approximate the thickness of said outer layer.

10. A switch apparatus comprising:

a substrate of a resilient material having a substantially planar first surface, a channel formed through said substrate to define a flex portion of said substrate, at least part of said flex portion of said substrate being movable relative to said substrate between a first position and a second position which is different from the first position;

a layer of an elastic material disposed over at least a substantial portion of said first surface of said substrate, said layer of elastic material urging said flex portion to the first position of said flex portion; and a switch element operatively associated with said flex portion of said substrate, said switch element having an electrical condition which varies as a function of the position of said flex portion relative to said substrate;

said layer of elastic material comprises a layer of an elastic resin material integrally molded in situ onto said first surface of said substrate, said layer of elastic resin material bonding with part of said flex portion of said substrate.

11. The apparatus of claim 10 wherein said substrate defines a circuit board.

12. A switch apparatus comprising:

a substrate of a resilient material having a substantially planar first surface, a channel formed through said substrate to define a flex portion of said substrate, at least part of said flex portion of said substrate being movable relative to said substrate between a first position and a second position which is different from the first position;

a layer of an elastic material disposed over at least a substantial portion of said first surface of said substrate, said layer of elastic material urging said flex portion to the first position of said flex portion; and a switch element operatively associated with said flex portion of said substrate, said switch element having an electrical condition which varies as a function of the position of said flex portion relative to said substrate; and upon application of force to said switch element, said flex portion moves from the first position, in which said flex portion is substantially aligned with said substrate, to the second position, in which said flex portion is not substantially aligned with said substrate and, upon removal of the force to the said switch element, said layer of elastic material urging said flex portion to the first position.

13. A steering wheel cover assembly for a vehicle steering wheel comprising:

a substrate having a substantially planar first surface, said substrate including a flex portion formed in said substrate, said flex portion being movable between a first position and a second position, which is different from the first position;

at least one switch element operatively connected with said flex portion of said substrate, said switch element having an electrical condition which varies as a function of the position of said flex portion relative to said substrate; and an outer layer of an elastic material integrally disposed over at least a substantial portion of said first surface of said substrate and connected with a part of said flex portion, said outer layer urging said flex portion of said substrate to the first position;

said switch element including a housing having a sidewall portion which extends outwardly from the first surface of said flex portion and terminates in an end portion of said housing, said housing having an inner chamber formed within said housing.

14. The assembly of claim 13 further including a light emitting diode disposed within said inner chamber of said switch element and electrically connected with said controller, said controller being operable to forward bias said diode.

15. The assembly of claim 13 wherein said end portion of said housing is formed of a substantially transparent material to permit passage of light from said diode through said end portion of said housing, upon said diode being forward biased.

16. A switch apparatus comprising:

a substrate of a resilient material having a substantially planar first surface, two channels formed through said substrate and which terminate spaced apart from each other, said channels being arcuate and defining a circular flex portion, at least a part of said circular flex portion of said substrate being movable relative to said substrate between a first position and a second position which is different from the first position;

a layer of an elastic material disposed over at least a substantial portion of said first surface of said substrate, said layer of elastic material urging said circular flex portion to the first position of said circular flex portion; and a switch element operatively associated with said circular flex portion of said substrate, said switch element having an electrical condition which varies as a function of the position of said circular flex portion relative to said substrate.

* * * * *